United States Patent
Welty

(10) Patent No.: US 9,783,248 B1
(45) Date of Patent: Oct. 10, 2017

(54) REAR WHEELHOUSE VENT ASSEMBLY AND A VEHICLE

(71) Applicant: GM GLOBAL TECHNOLOGY OPERATIONS LLC, Detroit, MI (US)

(72) Inventor: Mark Welty, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/438,821

(22) Filed: Feb. 22, 2017

(51) Int. Cl.
| B62D 35/00 | (2006.01) |
| B62D 25/02 | (2006.01) |
| B62D 25/16 | (2006.01) |
| B62D 25/08 | (2006.01) |
| B60R 19/48 | (2006.01) |

(52) U.S. Cl.
CPC ............ *B62D 35/008* (2013.01); *B60R 19/48* (2013.01); *B62D 25/02* (2013.01); *B62D 25/08* (2013.01); *B62D 25/16* (2013.01)

(58) Field of Classification Search
CPC ...... B62D 35/008; B62D 25/02; B62D 25/08; B62D 25/16; B60R 19/48; B60R 13/0861
USPC ............................................. 296/198, 180.1
See application file for complete search history.

(56) References Cited

U.S. PATENT DOCUMENTS

| 4,334,694 A * | 6/1982 | Iwanicki ................ | B62D 25/18 280/848 |
| 4,772,060 A * | 9/1988 | Kretschmer .......... | B62D 35/02 296/180.1 |
| 5,820,203 A * | 10/1998 | Morelli ................... | B60C 23/18 180/903 |

OTHER PUBLICATIONS

Photo of a vehicle from the internet page: http://o.aolcdn.com/dims-global/dims3/GLOB/legacy_thumbnail/750x422/quality/95/http://www.blogcdn.com/slideshows/images/slides/306/184/2/S3061842/slug/l/2016-bmw-x6m-27-1.jpg; retrieved on Jan. 9, 2017; 1 page.
Photo of a vehicle from the internet page: http://st.motortrend.com/uploads/sites/5/2014/12/2015-Mercedes-Benz-S63-AMG-4Matic-Coupe-lower-rear-bumper.jpg; retrieved on Jan. 6, 2017; 1 page.
Photo of a vehicle from the internet page: http://st.automobilemag.com/uploads/sites/10/2015/09/2015-Dodge-Charger-RT-Scat-Pack-rear-three-quarter-view.jpg; retrieved on Jan. 6, 2017; 1 page.
Photo of a vehicle from the internet page: http://www.cecoret.com/shop/images/products/110705131730_3617.jpg; retrieved on Jan. 6, 2017; 1 page.

* cited by examiner

*Primary Examiner* — Joseph D Pape
(74) *Attorney, Agent, or Firm* — Quinn IP Law

(57) ABSTRACT

A rear wheelhouse vent assembly and a vehicle include a wheelhouse liner. A first edge of the wheelhouse liner defines a cutout that is open along the first edge. The assembly includes a side panel and a duct. The side panel defines a recess, and the wheelhouse liner is disposed along the recess transverse to the side panel to define an open area. The duct is disposed in the cutout. The duct includes a first wall, a second wall and a third wall. The second wall is disposed between the first and third walls. The first and third walls each extend outwardly away from the second wall to respective distal ends to space the second wall from an inner surface of the side panel. The duct is secured to the inner surface and presents a tunnel that vents the open area.

20 Claims, 3 Drawing Sheets

US 9,783,248 B1

REAR WHEELHOUSE VENT ASSEMBLY AND A VEHICLE

INTRODUCTION

Vehicles have been designed with a spoiler along a rear end of the vehicle to improve aerodynamics. As another example, some vehicles can have a vent along the front quarter panel of the vehicle. When the vehicle is moving forward, a flow of air forms along the side of the vehicle. The vent expels air into the flow of air along the side of the vehicle, which is a high pressure location along the front quarter panel. The expulsion of air can create drag on the vehicle.

SUMMARY

The present disclosure provides a rear wheelhouse vent assembly including a wheelhouse liner having a first end and a second end spaced from each other. The wheelhouse liner also has a first edge and a second edge spaced from each other. The first and second edges each extend between the first and second ends. The first edge defines a cutout that is open along the first edge, and spaced from the second edge and the first and second ends. The assembly also includes a side panel and a duct. The side panel defines a recess, and the wheelhouse liner is disposed along the recess transverse to the side panel to define an open area. The side panel includes an outer surface facing away from the first edge of the wheelhouse liner and an inner surface facing at least part of the first edge of the wheelhouse liner. The first edge is disposed closer to the side panel than the second edge. The second edge is spaced from the side panel. The duct is disposed in the cutout. The duct has a first end coupled to the wheelhouse liner and a second end spaced from the wheelhouse liner. The first end of the duct defines an inlet and the second end of the duct defines an outlet. The duct includes a first wall, a second wall and a third wall. The second wall is disposed between the first and third walls. The first and third walls each extend outwardly away from the second wall to respective distal ends to space the second wall from the inner surface of the side panel. The duct is secured to the inner surface and presents a tunnel that vents the open area.

The present disclosure also provides a vehicle including a bumper fascia and a rear quarter panel fascia disposed transverse to the bumper fascia. The rear quarter panel fascia defines a recess. The rear quarter panel fascia includes an outer surface and an inner surface opposing the outer surface. The vehicle includes a wheelhouse liner disposed along the recess transverse to the rear quarter panel fascia to define an open area. The wheelhouse liner has a first end and a second end spaced from each other. The wheelhouse liner also has a first edge and a second edge spaced from each other. The first and second edges each extend between the first and second ends. The first edge defines a cutout that is open along the first edge, and spaced from the second edge and the first and second ends. The outer surface of the rear quarter panel fascia faces away from the first edge of the wheelhouse liner and the inner surface of the rear quarter panel fascia faces at least part of the first edge of the wheelhouse liner. The first edge is disposed closer to the rear quarter panel fascia than the second edge. The second edge is spaced from the rear quarter panel fascia. The vehicle also includes a duct disposed in the cutout. The duct has a first end coupled to the wheelhouse liner and a second end spaced from the wheelhouse liner. The first end of the duct defines an inlet that is exposed adjacent to the wheelhouse liner and the second end of the duct defines an outlet that is exposed adjacent to one of the bumper fascia and the rear quarter panel fascia. The duct also includes a first wall, a second wall and a third wall. The second wall is disposed between the first and third walls. The first and third walls each extend outwardly away from the second wall to respective distal ends to space the second wall from the inner surface of the rear quarter panel fascia. The duct is secured to the inner surface and presents a tunnel that vents the open area.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges. The phrase "at least one of" as used herein should be construed to include the non-exclusive logical "or", i.e., A and/or B and so on depending on the number of components.

Figure 1:
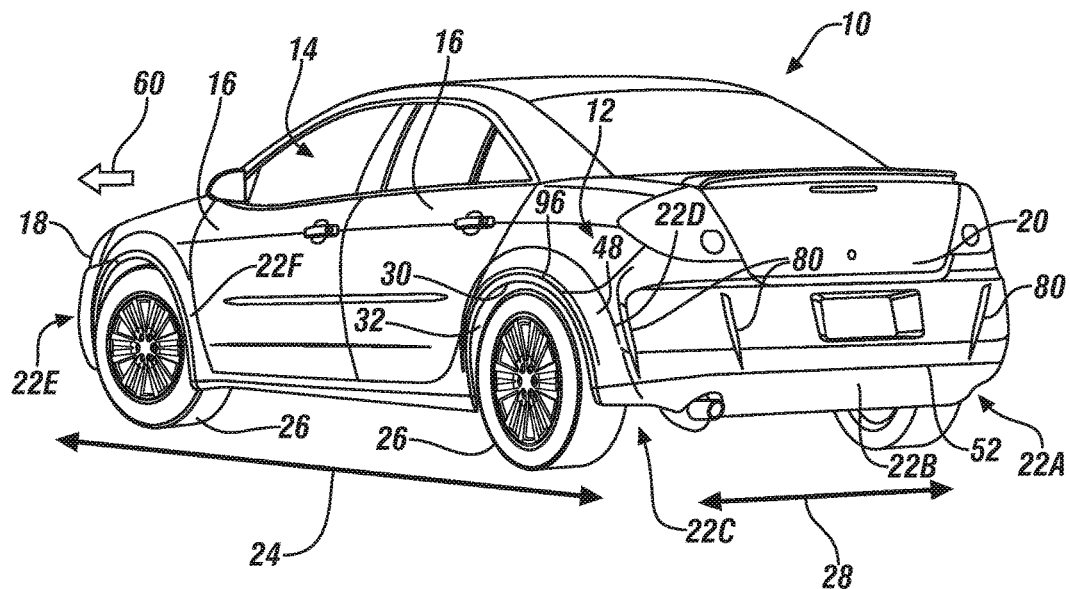
FIG. 1 is a schematic perspective view of a vehicle and a rear wheelhouse vent assembly.

Referring to the FIGS., wherein like numerals indicate like or corresponding parts throughout the several views, a vehicle 10 and a rear wheelhouse vent assembly 12 are generally shown in FIG. 1. Generally, the rear wheelhouse vent assembly 12 expels a flow of air generally behind the vehicle 10 to improve aerodynamics of the vehicle 10 which is discussed in detail further below.

The rear wheelhouse vent assembly 12 can be utilized in a vehicle application or a non-vehicle application. Non-limiting examples of the vehicles 10 can include cars, trucks, boats, watercrafts, off-road vehicles, aircrafts, farm equipment or any other suitable movable platform. Additionally, the vehicle 10 can include autonomously driven vehicles or vehicles driven via a human. Non-limiting examples of the non-vehicles can include machines, farm equipment or any other suitable non-vehicle.

For the vehicle application, the vehicle 10 can include a passenger compartment 14 (see FIG. 1). Generally, one or more occupants can be disposed in the passenger compartment 14. Furthermore, for a vehicle 10 driven by the human, one of the occupants can steer the vehicle 10 from the passenger compartment 14. The passenger compartment 14 can have one or more doors 16 that open and close to allow the occupants to enter and exit the vehicle 10.

Continuing with FIG. 1, the vehicle 10 can include a front end 18 and a rear end 20, with a plurality of fascia pieces or panels 22A-F, some or all of which are visible from the outside of the passenger compartment 14 of the vehicle 10. The front and rear ends 18, 20 are spaced from each other along a length 24 of the vehicle 10. Generally, the fascia pieces or panels 22A-F surround the vehicle 10. The vehicle 10 can also include one or more wheels 26, and therefore, depending on the number of wheels 26 that the vehicle 10 utilizes, one or more of the fascia pieces 22A-F can be configured to allow the wheel 26 to be inserted under part of the vehicle 10.

Continuing with FIG. 1, the fascia pieces or panels 22A-F can include one or more of a rear panel 22A which can include a bumper fascia 22B, a side panel 22C which can include a rear quarter panel fascia 22D and another side panel 22E which can include a front quarter panel fascia 22F. FIG. 1 best illustrates one side of the vehicle 10, and it is to be appreciated that the other side of the vehicle 10 can be a mirror image of the illustrated side. The sides of the vehicle 10 are spaced from each other in a cross-car direction 28. The cross-car direction 28 is transverse or perpendicular to the length 24 of the vehicle 10. In other words, the rear and front quarter panel fascias 22D, 22F along one side of the vehicle 10 is spaced in the cross-car direction 28 from the rear and front quarter panel fascias 22D, 22F along the other side of the vehicle 10.

For example, a pair of front side panels 22E, such as a pair of front quarter panel fascias 22F, can be disposed along each opposing side of the vehicle 10 proximal to the front end 18 of the vehicle 10. In other words, the vehicle 10 can include one front quarter panel fascia 22F along the driver's side of the vehicle 10 near the front end 18 and another front quarter panel fascia 22F along the passenger's side of the vehicle 10 near the front end 18. As another example, a pair of side panels 22C, such as a pair of rear quarter panel fascias 22D, can be disposed along each opposing side of the vehicle 10 proximal to the rear end 20 of the vehicle 10. In other words, the vehicle 10 can include one rear quarter panel fascia 22D along the driver's side of the vehicle 10 near the rear end 20 and another rear quarter panel fascia 22D along the passenger's side of the vehicle 10 near the rear end 20.

The bumper fascia 22B can be disposed along one of the front end 18 and the rear end 20 of the vehicle 10. In certain embodiments, the bumper fascia 22B is disposed along the rear end 20. As mentioned above, the rear panel 22A can include the bumper fascia 22B. Therefore, in certain embodiments, the rear panel 22A is disposed along the rear end 20 of the vehicle 10. Furthermore, the rear quarter panel fascia 22D can be disposed transverse to the bumper fascia 22B. As such, the side panel 22C can be disposed transverse to the rear panel 22A. If utilizing more than one side panel 22C, the side panels 22C are both disposed transverse to the bumper fascia 22B or the rear panel 22A, with the bumper fascia 22B disposed between the side panels 22C.

Continuing with FIG. 1, the side panel 22C or the rear quarter panel fascia 22D can also define a recess 30. The recess 30 presents an opening to insert the wheel 26 under part of the vehicle 10. The side panel 22C or the rear quarter panel fascia 22D of the other side can be a mirror image of the side panel 22C or the rear quarter panel fascia 22D of FIG. 1, and thus also define the recess 30 that presents the opening to insert another wheel 26 under part of the vehicle 10.

Figure 2:
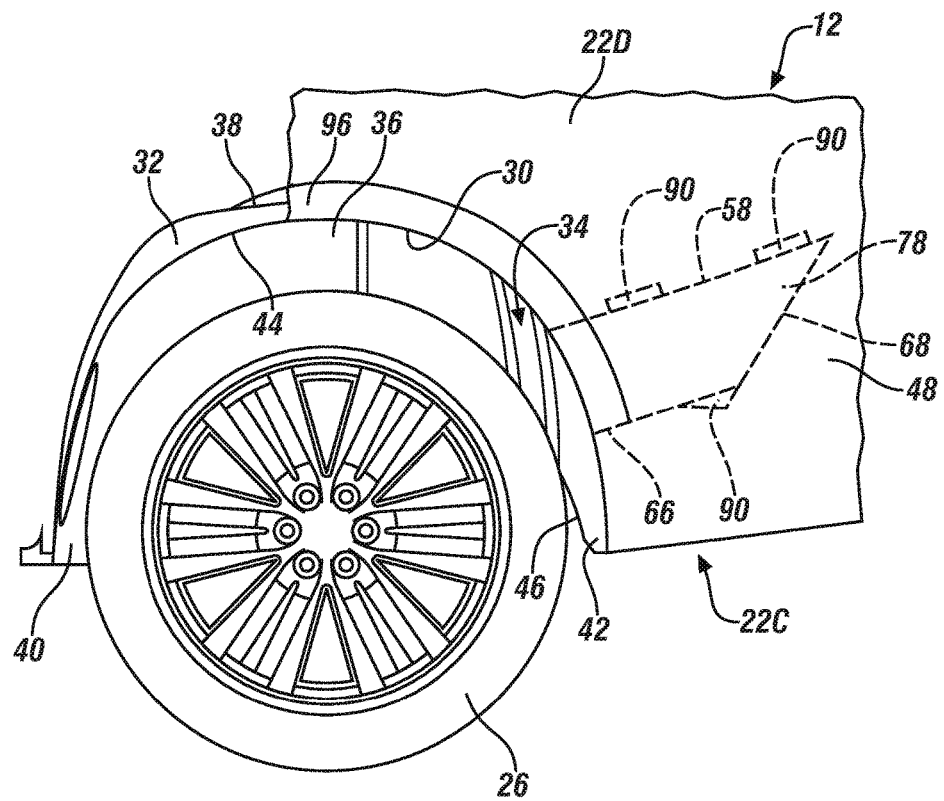
FIG. 2 is a schematic fragmentary side view of the rear wheelhouse vent assembly.

As best shown in FIGS. 1 and 2, the rear wheelhouse vent assembly 12 includes a wheelhouse liner 32. The wheelhouse liner 32 is disposed along the recess 30 transverse to the side panel 22C/rear quarter panel fascia 22D to define an open area 34. In other words, the wheelhouse liner 32 cooperates with the side panel 22C along the recess 30 and is disposed in a different orientation than the side panel 22C to present a boundary of the open area 34 that the wheel 26 is disposed inside. The wheelhouse liner 32 can prevent objects or debris from being kicked, by the rotating wheel 26, into parts of the vehicle 10 behind the wheelhouse liner 32.

Furthermore, the wheelhouse liner 32 can include a first surface 36 and a second surface 38 opposing the first surface 36. The first surface 36 can be visible in the open area 34 and the second surface 38 can be concealed by the side panel 22C. Therefore, an object or debris that is kicked up into the wheelhouse liner 32, directly engages the first surface 36. The second surface 38 faces inwardly toward various components concealed behind the wheelhouse liner 32. Therefore, the second surface 38 is concealed such that objects or debris cannot directly engage the second surface 38. It is to be appreciated that each rear quarter panel fascia 22D can have a corresponding wheelhouse liner 32 disposed along the recess 30 to present respective boundaries of the open area 34 that the respective wheel 26 is disposed inside.

Figure 3:
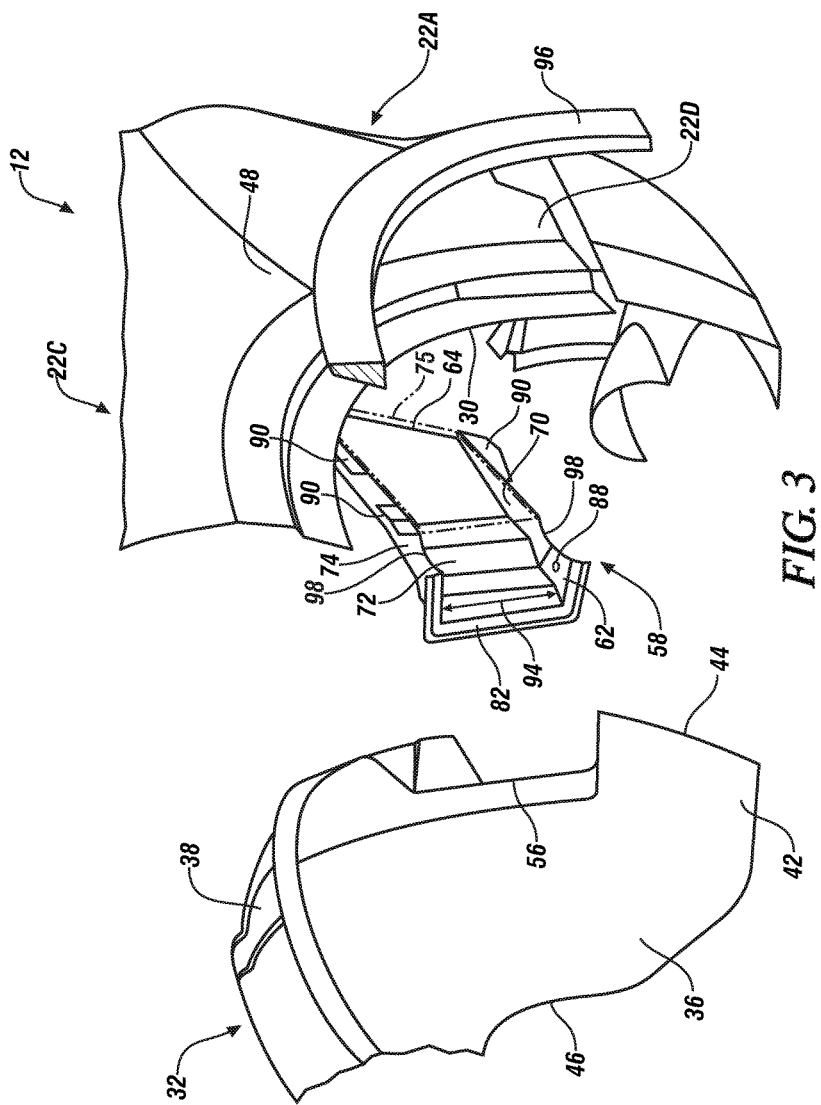
FIG. 3 is a schematic perspective exploded view of a wheelhouse liner and a duct relative to one or more panels.

Referring to FIGS. 2 and 3, the wheelhouse liner 32 has a first end 40 and a second end 42 spaced from each other. More specifically, the first and second ends 40, 42 of the wheelhouse liner 32 are spaced from each other along the length 24 of the vehicle 10, i.e., spaced from each other substantially parallel to the length 24. Therefore, the first end 40 of the wheelhouse liner 32 is disposed in front of the respective wheel 26 relative to the front end 18 of the vehicle 10, and the second end 42 of the wheelhouse liner 32 is disposed behind the respective wheel 26 relative to the front end 18 of the vehicle 10.

The wheelhouse liner 32 also has a first edge 44 and a second edge 46 spaced from each other. More specifically, the first and second edges 44, 46 are spaced from each other in the cross-car direction 28, i.e., spaced from each other substantially parallel to the cross-car direction 28. The first and second edges 44, 46 each extend between the first and second ends 40, 42 of the wheelhouse liner 32.

Figure 4:
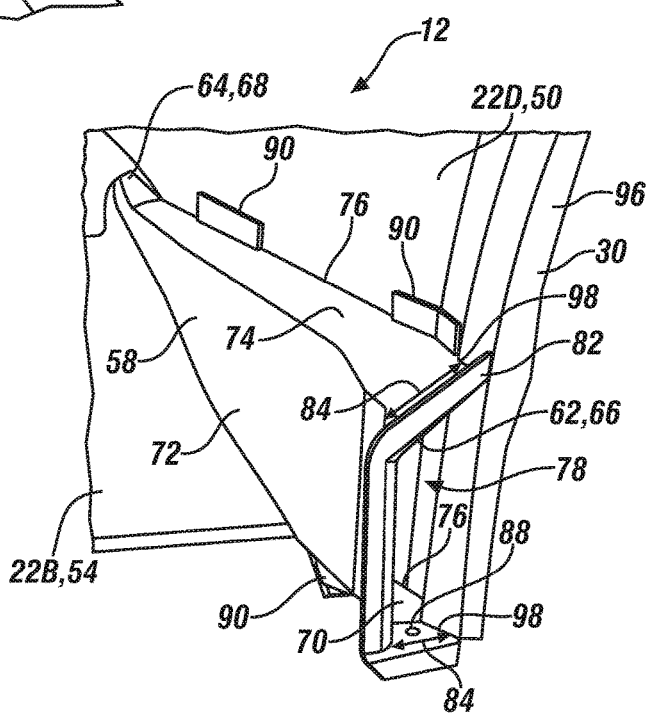
FIG. 4 is a schematic perspective view of the duct attached to a side panel with the wheelhouse liner removed.

Referring to FIGS. 3 and 4, the side panel 22C or the rear quarter panel fascia 22D can include an outer surface 48 and an inner surface 50 opposing the outer surface 48. More specifically, the outer surface 48 of the side panel 22C/rear quarter panel fascia 22D faces away from the first edge 44 of the wheelhouse liner 32, and the inner surface 50 of the side panel 22C/rear quarter panel fascia 22D faces at least part of the first edge 44 of the wheelhouse liner 32. Generally, the first edge 44 of the wheelhouse liner 32 is disposed closer to the side panel 22C/rear quarter panel fascia 22D than the second edge 46 of the wheelhouse liner 32. Furthermore, the second edge 46 of the wheelhouse liner 32 is spaced from the side panel 22C/rear quarter panel fascia 22D. The wheelhouse liner 32 can also conceal at least part of the inner surface 50 of the side panel 22C/rear quarter panel fascia 22D.

Additionally, the rear panel 22A or the bumper fascia 22B can include an outer surface 52 (as best shown in FIG. 1) and an inner surface 54 (as best shown in FIG. 4) opposing the outer surface 52. The rear panel 22A can be disposed transverse to the side panel 22C such that the inner surface 54 of the rear panel 22A is spaced apart and faces the wheelhouse liner 32. Simply stated, the rear panel 22A or the bumper fascia 22B is disposed along the rear end 20 of the vehicle 10. The inner surfaces 50, 54 of the side panel 22C and the rear panel 22A each face inwardly toward various components concealed behind the panels 22A, C, and the outer surfaces 48, 52 of the side panel 22C and the rear panel 22A each face outwardly toward the surfaces visible from outside of the vehicle 10.

Turning back to the wheelhouse liner 32, as best shown in FIG. 3, the first edge 44 defines a cutout 56 that is open along the first edge 44, and the cutout 56 is spaced from the second edge 46 and the first and second ends 40, 42 of the wheelhouse liner 32. Furthermore, the cutout 56 is disposed closer to the second end 42 of the wheelhouse liner 32 than the first end 40 of the wheelhouse liner 32. Simply stated, the cutout 56 is disposed behind the wheel 26 relative to the front end 18 of the vehicle 10.

Continuing with FIG. 3, the rear wheelhouse vent assembly 12 includes a duct 58 disposed in the cutout 56. During movement of the vehicle 10 in a forward direction 60, air flows around the panels 22A-F and some of the air enters the open area 34 behind the rear wheel 26; when this occurs, the duct 58 is configured to guide air out of the open area 34 behind the rear wheel 26 to a location away from the open area 34. The duct 58 can be configured to expel the air through the side panel 22C/rear quarter panel fascia 22D or through the rear panel 22A/bumper fascia 22B. Generally, the air is expelled proximal to the rear end 20 of the vehicle 10, i.e., expelled to a wake of the vehicle, to minimize overall aerodynamic drag.

FIG. 1 illustrates the two different locations that the duct 58 can expel the air. FIG. 1 also illustrates the rear wheelhouse vent assembly 12 along one side of the vehicle 10 proximal to the rear end 20 of the vehicle 10, which can be mirrored to the other side of the vehicle 10. Hence, both wheelhouse liners 32 and the side panels 22C for the rear wheels 26 can be configured with respective ducts 58 that expel air to a location away from the open area 34 of the respective rear wheels 26.

If no duct 58 is utilized, the air that enters the open area 34 behind the rear wheel 26 is turbulent and creates pressure on the wheelhouse liner 32. Furthermore, if no duct 58 is utilized, the overall aerodynamic drag of the vehicle 10 is greater than when utilizing the duct 58 due to the turbulent air and pressure on the wheelhouse liner 32. As such, the rear wheelhouse vent assembly 12 reduces turbulent air, reduces pressure on the wheelhouse liner 32 and reduces the overall aerodynamic drag of the vehicle 10 by venting the air to a lower pressure location in the wake of the vehicle 10, as compared to when the duct 58 is eliminated or as compared to when a vent is expelling air along the front quarter panel fascia 22F.

Figure 5:
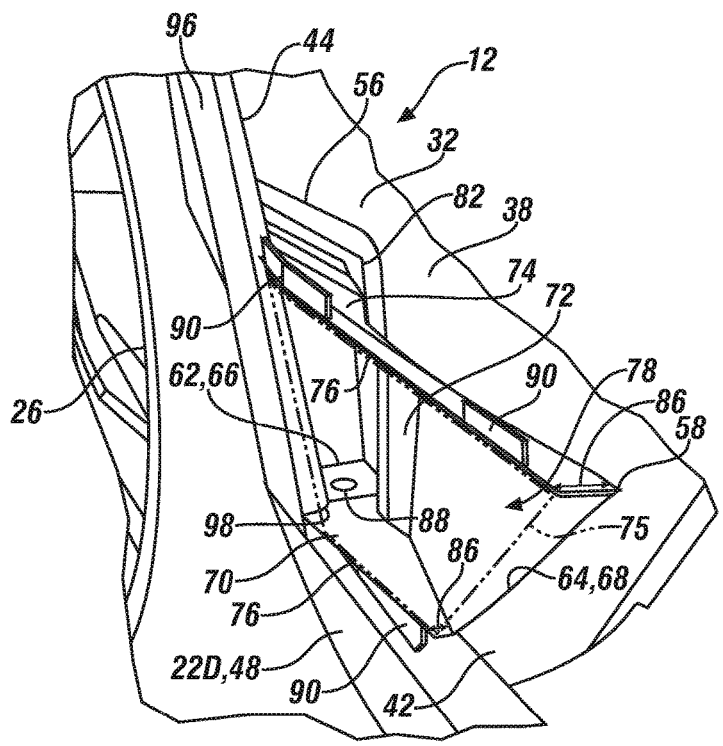
FIG. 5 is a schematic fragmentary perspective view of the duct with a portion of the side panel removed.

As best shown in FIGS. 2 and 5, the duct 58 has a first end 62 coupled to the wheelhouse liner 32 and a second end 64 spaced from the wheelhouse liner 32. More specifically, the first and second ends 62, 64 of the duct 58 are spaced from each other along the length 24 of the vehicle 10, i.e., spaced from each other substantially parallel to the length 24. The first end 62 of the duct 58 defines an inlet 66 and the second end 64 of the duct 58 defines an outlet 68. FIG. 2 generally illustrates the duct 58 in hidden lines behind the side panel 22C which shows the general location of the duct 58 relative to the wheel 26 and the wheelhouse liner 32.

As best shown in FIG. 5, the inlet 66 is exposed adjacent to the wheelhouse liner 32 and the outlet 68 is exposed adjacent to one of the rear panel 22A/bumper fascia 22B and the side panel 22C/rear quarter panel fascia 22D. As mentioned above, FIG. 1 illustrates two different locations that the duct 58 can expel the air from the open area 34. The inlet 66 receives the air from behind the wheel 26 of the open area 34 and the outlet 68 expels the air to the wake of the vehicle 10 which minimizes pressure on the wheelhouse liner 32 proximal to the second end 42 of the wheelhouse liner 32 and increases pressure of the rear panel 22A to minimize the overall aerodynamic drag of the vehicle 10.

Turning to FIGS. 3-5, in certain embodiments, the duct 58 can be open along one side, which will be discussed further below. Therefore, the duct 58 includes a first wall 70, a second wall 72 and a third wall 74. Optionally, in other embodiments, the duct 58 can also include a fourth wall 75, which will be discussed further below. The fourth wall 75 is shown in phantom lines in the FIGS. for illustrative purposes.

The second wall 72 is disposed between the first and third walls 70, 74. The first and third walls 70, 74 each extend outwardly away from the second wall 72 to respective distal ends 76 to space the second wall 72 from the inner surface 50 of the side panel 22C/rear quarter panel fascia 22D (see FIG. 4). Therefore, the second wall 72 is spaced from the side panel 22C/rear quarter panel fascia 22D by the first and third walls 70, 74.

Generally, the duct 58 is secured to the inner surface 50 of the side panel 22C/rear quarter panel fascia 22D and presents a tunnel 78 that vents the open area 34. The duct 58 can be in any suitable configuration, and a couple different non-limiting configurations are discussed below.

In certain embodiments, the distal ends 76 of the first and third walls 70, 74 engage the inner surface 50 to present the tunnel 78 defined by the inner surface 50 of the side panel 22C/rear quarter panel fascia 22D and the first, second and third walls 70, 72, 74 to vent the open area 34. As such, in certain embodiments, the duct 58 does not include the fourth wall 75 to close the tunnel 78, and instead, the side panel 22C/rear quarter panel fascia 22D is utilized to close the tunnel 78 with the walls 70, 72, 74 of the duct 58. Therefore, in this embodiment, the duct 58 can be characterized by an absence of the fourth wall 75 such that the first, second and third walls 70, 72, 74 and the inner surface 50 of the side panel 22C/rear quarter panel fascia 22D define the tunnel 78 that vents the open area 34. Hence, part of the inner surface 50 of the side panel 22C/rear quarter panel fascia 22D, the first wall 70, the second wall 72 and the third wall 74 surround the tunnel 78.

In other embodiments, the duct 58 can include the fourth wall 75 (shown in phantom lines in FIGS. 3 and 5) disposed between the first and third walls 70, 74. The fourth wall 75 can be spaced from the second wall 72 and the fourth wall 75 can abut at least a portion of the inner surface 50 of the side panel 22C/rear quarter panel fascia 22D such that the first, second, third and fourth walls 72, 72, 74, 75 define the tunnel 78 that vents the open area 34. Therefore, the fourth wall 75 is disposed closer to the inner surface 50 of the side panel 22C/rear quarter panel fascia 22D than the second wall 72. In certain embodiments, the fourth wall 75 abuts the distal ends 76 of the first and third walls 70, 74. Therefore, the walls 70, 72, 74, 75 surround the tunnel 78. Optionally, the second and fourth walls 72, 75 can be substantially the same length relative to the length 24 of the vehicle 10, or alternatively, the second and fourth walls 72, 75 can be different lengths. As one non-limiting example, FIGS. 3 and 5 illustrate the length of the fourth wall 75 being shorter than the length of the second wall 72. Therefore, in certain embodiments, the fourth wall 75 can include an edge that abuts an edge of the side panel 22C/rear quarter panel fascia 22D (see FIGS. 3 and 5).

The open area 34 behind the wheel 26 is vented to a location away from the wheel 26 which minimizes turbulence in that location and minimizes pressure on the wheelhouse liner 32 near the second end 42 of the wheelhouse liner 32, which thus minimizes the overall aerodynamic drag of the vehicle 10. Therefore, when the vehicle 10 is moving in the forward direction 60, air flows around the vehicle 10 and some of the air enters the open area 34 by the wheelhouse liner 32. Some of the air that enters the open area 34 can flow through the duct 58 and out of the open area 34. As discussed above, by venting the open area 34, turbulence is minimized in the location behind the wheel 26, as well as pressure is minimized on the wheelhouse liner 32 near the second end 42 of the wheelhouse liner 32, which thus, minimizes the overall aerodynamic drag of the vehicle 10. The expelled air from the open area 34 of the rear wheel 26 enters the flow of air near the wake of the vehicle 10 at the rear end 20, which reduces the overall aerodynamic drag of the vehicle 10 as compared to the expelled air exiting to the side of the vehicle 10 near one of the front quarter panel fascias 22F. Therefore, the rear wheelhouse vent assembly 12 is disposed closer to the rear wheels 26 than the front wheels 26. Said differently, the rear wheelhouse vent assembly 12 is not utilized with the front quarter panel fascias 22F.

As best shown in FIG. 1, generally, at least one of the side panel 22C and the rear panel 22A can define an aperture 80. Therefore, the side panel 22C and/or the rear panel 22A can define the aperture 80. The outlet 68 of the duct 58 can align with the aperture 80. The aperture 80 is configured to expel the air from the open area 34 to the desired location. Therefore, the aperture 80 and the outlet 68 cooperate to vent the air out of the open area 34. As mentioned above, FIG. 1 illustrates two different locations that the duct 58 can expel the air, and thus, FIG. 1 also illustrates two different locations for the aperture 80. Furthermore, as also discussed above, FIG. 1 illustrates the rear wheelhouse vent assembly 12 along one side of the vehicle 10 which can be mirrored to the other side of the vehicle 10, and therefore, the aperture 80 can be mirrored to the other side of the vehicle 10.

As mentioned above, FIG. 1 illustrates two non-limiting examples of the location of the aperture 80. In certain embodiments, as shown in FIG. 1, the side panel 22C can define the aperture 80. In this embodiment, the outlet 68 of the duct 58 can align with the aperture 80 of the side panel 22C. Furthermore, in this embodiment, the inner and outer surfaces 50, 48 of the side panel 22C can define the aperture 80. In other embodiments, as also shown in FIG. 1, the rear panel 22A can define the aperture 80. In this embodiment, the outlet 68 of the duct 58 can align with the aperture 80 of the rear panel 22A. Furthermore, in this embodiment, the outer and inner surfaces 52, 54 of the rear panel 22A can define the aperture 80.

Referring to FIGS. 3 and 4, optionally, the duct 58 can include a flange 82 at the first end 62 of the duct 58. The flange 82 can extend from each of the first, second and third walls 70, 72, 74. In certain embodiments, the flange 82 can overlap a portion of the wheelhouse liner 32. The flange 82 can overlap the portion of the wheelhouse liner 32 to minimize air seeping between the outside of the duct 58 and the wheelhouse liner 32. The flange 82 can overlap the first edge 44 of the wheelhouse liner 32 around the cutout 56. In certain embodiments, the flange 82 can overlap a portion of the first surface 36 of the wheelhouse liner 32, and thus, the flange 82 is spaced from the second surface 38 of the wheelhouse liner 32.

The flange 82 can be any suitable configuration, and the FIGS. are illustrative only. Optionally, the flange 82 can be secured to the wheelhouse liner 32 by any suitable methods, and non-limiting examples can include one or more fasteners, clips, tabs, studs, pins, barbs, rivets, adhesive, welding, sonic welding, soldering, press fit, interference fit, etc.

Referring to FIGS. 3-5, the duct 58 is configured to decrease in size, which increases the flow of air through the duct 58. Said differently, the tunnel 78 can narrow between the first and second ends 62, 64 of the duct 58 which increases the flow of air through the tunnel 78 to sufficiently move the air away from the open area 34. As such, the tunnel 78 is wider at the inlet 66 than at the outlet 68.

To achieve the increase in the flow of air, one or more of the walls 70, 72, 74 can be angled and/or narrowed. In certain embodiments, the second wall 72 is angled to decrease the size of the duct 58 which increases the flow of air through the duct 58. Therefore, for example, the second wall 72 can angle toward the inner surface 50 of the side panel 22C (as best shown in FIG. 4). Specifically, the second wall 72 can angle toward the inner surface 50 of the side panel 22C such that the tunnel 78 narrows between the first and second ends 62, 64 of the duct 58.

Continuing with FIGS. 3-5, the first and/or third walls 70, 74 can angle and/or narrow. For example, the first and third walls 70, 74 can each define a first width 84 at the inlet 66 of the duct 58 and a second width 86 at the outlet 68 of the duct 58. The second width 86 can be less than the first width 84 of the first and third walls 70, 74. As such, in certain embodiments, the first wall 70 can narrow as the first wall 70 extends from the first end 62 of the duct 58 to the second end 64 of the duct 58 (as best shown in FIG. 3), i.e., smaller width at the outlet 68 than the inlet 66. Furthermore, in certain embodiments, the third wall 74 can narrow as the third wall 74 extends from the first end 62 of the duct 58 to the second end 64 of the duct 58 (as best shown in FIG. 4), i.e., smaller width at the outlet 68 than the inlet 66. Therefore, in one embodiment, the first and third walls 70, 74 each narrow, and the second wall 72 angles.

As best shown in FIGS. 3 and 5, the first wall 70 can be disposed transverse to the inner surface 50 of the side panel 22C and transverse to the second wall 72. Furthermore, the first wall 70 can be disposed closer to the second end 42 of the wheelhouse liner 32 than the third wall 74. Simply stated, the first wall 70 can be disposed below the third wall 74 relative to the ground. The ground being what the wheels 26 move across. In certain embodiments, the first wall 70 can be angled to drain debris and/or liquid fluid out of the duct 58. Therefore, for example, the first wall 70 can angle toward the third wall 74 as the first wall 70 extends from the first end 62 of the duct 58 to the second end 64 of the duct 58.

To drain the duct 58, the first wall 70 can define a slot 88 (see FIGS. 3-5). The slot 88 allows the debris and/or liquid fluid to exit the duct 58. In certain embodiments, the slot 88 can be disposed closer to the first end 62 of the duct 58 than the second end 64 of the duct 58. In other embodiments, if the first wall 70 is angled appropriately, the slot 88 can be disposed closer to the second end 64 of the duct 58 than the first end 62 of the duct 58. It is to be appreciated that the slot 88 can be disposed in any suitable location along the duct 58 to drain debris and/or liquid fluid from the duct 58 depending on the configuration of the first wall 70.

Referring to FIGS. 2-4, the duct 58 is secured to at least one of the side panel 22C and the wheelhouse liner 32. Therefore, the duct 58 can be secured to the side panel 22C or the wheelhouse liner 32, and in other embodiments, the duct 58 can be secured to the side panel 22C and the wheelhouse liner 32.

The duct 58 can be secured to the side panel 22C by any suitable methods, and non-limiting examples can include one or more fasteners, clips, tabs, studs, pins, barbs, rivets, adhesive, welding, sonic welding, soldering, press fit, interference fit, etc. In certain embodiments, the first and third walls 70, 74 can each include at least one projection 90. The projection 90 can be secured to the inner surface 50 of the side panel 22C. Therefore, in one embodiment, the first and third walls 70, 74 each include one projection 90.

In certain embodiments, the projection 90 is further defined as a plurality of projections 90. Therefore, the first wall 70 can include the plurality of projections 90 and the third wall 74 can include one projection 90. In other embodiments, the third wall 74 can include the plurality of projections 90 and the first wall 70 can include one projection 90. In yet other embodiments, the first and third walls 70, 74 can each include the plurality of projections 90. The projection(s) 90 can extend from the first and third walls 70, 74 in any suitable location, and one non-limiting example is that the projections 90 extend from the distal end 76 of the respective first and third walls 70, 74. As another non-limiting example, when utilizing the fourth wall 75, one or more of the projection(s) 90 can extend from the fourth wall 75. As one non-limiting example, the projection(s) 90 can be secured to the side panel 22C by sonic welding.

Figure 6:
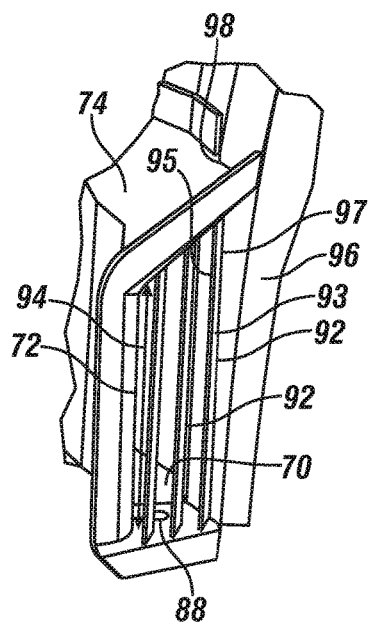
FIG. 6 is a schematic fragmentary perspective view of the duct with louvers.

Referring to FIG. 6, optionally, the rear wheelhouse vent assembly 12 can include at least one louver 92 disposed in the duct 58 which directs the flow of air into the tunnel 78 in a particular manner. In certain embodiments, the louver 92 is further defined as a plurality of louvers 92 spaced from each other. The louver(s) 92 can also include a first face 93 and a second face 95 opposing the first face 93. The first and/or second faces 93, 95 of the louver(s) 92 can be any suitable configuration, and as non-limiting examples of the configuration of the faces 93, 95 can be substantially flat, curved, tapered, etc., and/or combinations thereof.

The first and third wall 70, 74 can be spaced a first distance 94 from each other at the inlet 66 of the duct 58. The at least one louver 92 can be attached to the first and third walls 70, 74 such that the louver 92 extends along the first distance 94 and blocks a portion of the inlet 66. The louver(s) 92 can be positioned in any suitable orientation along the first distance 94, and non-limiting examples of the orientation of the louver(s) can include a rear edge 97 facing substantially straight toward the outlet 68, the rear edge 97 facing angularly toward the inner surface 50, the rear edge 97 facing angularly toward the second wall 72, etc., and/or combinations thereof. In certain embodiments, the louver(s) 92 are disposed closer to the inlet 66 than the outlet 68. In one embodiment, the louver(s) 92 are disposed at the inlet 66. If utilizing a plurality of louvers 92, each of the louvers 92 can be attached to the first and third walls 70, 74 such that the louvers 92 each extend along the first distance 94. The louver(s) 92 can be attached to the duct 58 by any suitable methods, and non-limiting examples can include one or more fasteners, clips, tabs, studs, pins, barbs, rivets, adhesive, welding, sonic welding, soldering, press fit, interference fit, molding, etc. Therefore, in certain embodiments, the louver(s) 92 can be a separate piece directly attached to the duct 58, and in other embodiments, the louver(s) 92 can be formed as one piece with the duct 58, i.e., integral.

In other embodiments, as shown in FIG. 4, the tunnel 78 is characterized by an absence of the louver(s) 92. In other words, the tunnel 78, the inlet 66 and the outlet 68 are unobstructed.

Optionally, as best shown in FIG. 3, the side panel 22C or rear quarter panel fascia 22D can include one or more molding pieces 96. The molding piece 96 can be disposed along the edge of the recess 30 of the respective side panel 22C/rear quarter panel fascia 22D. In certain embodiments, the edge of the fourth wall 75 can abut an edge of the molding piece 96 (see FIGS. 3 and 5). Optionally, when utilizing the molding piece 96, the duct 58 can define a notch 98 (best shown in FIG. 4) for receiving part of the molding piece 96. In certain embodiments, the first and/or the third walls 70, 74 of the duct 58 can define respective notches 98. Therefore, in certain embodiments, the fourth wall 75 is disposed behind the notches 98 relative to the front end 18 of the vehicle 10.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A rear wheelhouse vent assembly comprising:
a wheelhouse liner having a first end and a second end spaced from each other, and having a first edge and a second edge spaced from each other, and wherein the first and second edges each extend between the first and second ends, with the first edge defining a cutout that is open along the first edge, and spaced from the second edge and the first and second ends;
a side panel defining a recess, with the wheelhouse liner disposed along the recess transverse to the side panel to define an open area, and wherein the side panel includes an outer surface facing away from the first edge of the wheelhouse liner and an inner surface facing at least part of the first edge of the wheelhouse liner, with the first edge disposed closer to the side panel than the second edge, and with the second edge spaced from the side panel;
a duct disposed in the cutout and having a first end coupled to the wheelhouse liner and a second end spaced from the wheelhouse liner, with the first end of the duct defining an inlet and the second end of the duct defining an outlet; and
wherein the duct includes a first wall, a second wall and a third wall, with the second wall disposed between the first and third walls, and the first and third walls each extending outwardly away from the second wall to respective distal ends to space the second wall from the inner surface of the side panel, and with the duct secured to the inner surface and presenting a tunnel that vents the open area.

2. The assembly as set forth in claim 1 wherein the duct is characterized by an absence of a fourth wall such that the first, second and third walls and the inner surface of the side panel define the tunnel that vents the open area.

3. The assembly as set forth in claim 1 wherein the duct includes a fourth wall disposed between the first and third walls, with the fourth wall spaced from the second wall and abutting at least a portion of the inner surface such that the first, second, third and fourth walls define the tunnel that vents the open area.

4. The assembly as set forth in claim 1 wherein the side panel defines an aperture, with the outlet of the duct aligning with the aperture of the side panel.

5. The assembly as set forth in claim 1 further including a rear panel disposed transverse to the side panel such that an inner surface of the rear panel is spaced apart and faces the wheelhouse liner, and wherein the rear panel defines an aperture, with the outlet of the duct aligning with the aperture of the rear panel.

6. The assembly as set forth in claim 1 wherein the duct includes a flange at the first end, with the flange overlapping a portion of the wheelhouse liner.

7. The assembly as set forth in claim 1 wherein the wheelhouse liner includes a first surface and a second surface opposing the first surface, with the second surface concealed by the side panel, and wherein the flange overlaps a portion of the first surface.

8. The assembly as set forth in claim 1 wherein the first and third walls each define a first width at the inlet of the duct and a second width at the outlet of the duct, with the second width less than the first width of the first and third walls.

9. The assembly as set forth in claim 1 wherein the second wall angles toward the inner surface of the side panel.

10. The assembly as set forth in claim 1 wherein the first wall is disposed transverse to the inner surface of the side panel and transverse to the second wall, and wherein the first wall defines a slot.

11. The assembly as set forth in claim 1 wherein the first wall angles toward the third wall as the first wall extends from the first end of the duct to the second end of the duct.

12. The assembly as set forth in claim 11 wherein the first wall narrows as the first wall extends from the first end of the duct to the second end of the duct.

13. The assembly as set forth in claim 1 wherein the first and third walls each include at least one projection, with the projection secured to the inner surface of the side panel.

14. The assembly as set forth in claim 1 wherein the first and third wall are spaced a first distance from each other at the inlet of the duct, and further including at least one louver attached to the first and third walls such that the louver extends along the first distance and blocks a portion of the inlet.

15. The assembly as set forth in claim 1 wherein the side panel includes a rear quarter panel fascia and further including a rear panel that includes a bumper fascia.

16. The assembly as set forth in claim 1 wherein the tunnel narrows between the first and second ends of the duct.

17. The assembly as set forth in claim 1 wherein the tunnel is characterized by an absence of a louver.

18. The assembly as set forth in claim 1:
further including a rear panel disposed transverse to the side panel such that an inner surface of the rear panel is spaced apart and faces the wheelhouse liner, and wherein at least one of the side panel and the rear panel defines an aperture, with the outlet of the duct aligning with the aperture;
wherein the wheelhouse liner includes a first surface and a second surface opposing the first surface, with the second surface concealed by the side panel, and wherein the flange overlaps a portion of the first surface;
wherein the second wall angles toward the inner surface of the side panel such that the tunnel narrows between the first and second ends of the duct; and
wherein the first wall is disposed transverse to the inner surface of the side panel and transverse to the second wall, and wherein the first wall defines a slot disposed closer to the first end of the duct than the second end of the duct.

19. The assembly as set forth in claim 1:
wherein the side panel defines an aperture, with the outlet of the duct aligning with the aperture of the side panel;
wherein the wheelhouse liner includes a first surface and a second surface opposing the first surface, with the second surface concealed by the side panel, and wherein the flange overlaps a portion of the first surface;
wherein the second wall angles toward the inner surface of the side panel such that the tunnel narrows between the first and second ends of the duct; and
wherein the first wall is disposed transverse to the inner surface of the side panel and transverse to the second wall, and wherein the first wall defines a slot disposed closer to the first end of the duct than the second end of the duct.

20. A vehicle comprising:
a bumper fascia;
a rear quarter panel fascia disposed transverse to the bumper fascia and defining a recess, with the rear quarter panel fascia including an outer surface and an inner surface opposing the outer surface;
a wheelhouse liner disposed along the recess transverse to the rear quarter panel fascia to define an open area;
wherein the wheelhouse liner has a first end and a second end spaced from each other, and has a first edge and a second edge spaced from each other, and wherein the first and second edges each extend between the first and second ends, with the first edge defining a cutout that is open along the first edge, and spaced from the second edge and the first and second ends;
wherein the outer surface of the rear quarter panel fascia faces away from the first edge of the wheelhouse liner and the inner surface of the rear quarter panel fascia faces at least part of the first edge of the wheelhouse liner, with the first edge disposed closer to the rear quarter panel fascia than the second edge, and with the second edge spaced from the rear quarter panel fascia;
a duct disposed in the cutout and having a first end coupled to the wheelhouse liner and a second end spaced from the wheelhouse liner, with the first end of the duct defining an inlet that is exposed adjacent to the wheelhouse liner and the second end of the duct defining an outlet that is exposed adjacent to one of the bumper fascia and the rear quarter panel fascia; and
wherein the duct includes a first wall, a second wall and a third wall, with the second wall disposed between the first and third walls, and the first and third walls each extending outwardly away from the second wall to respective distal ends to space the second wall from the inner surface of the rear quarter panel fascia, and with the duct secured to the inner surface and presenting a tunnel that vents the open area.

* * * * *